UNITED STATES PATENT OFFICE 2,471,230

RESIDUE CARBOXYLIC ACID - ALKYLENE DIAMINE RESINS

Charles H. McKeever, Philadelphia, Pa., assignor to Rohm & Haas Company, Philadelphia, Pa., a corporation of Delaware No Drawing. Application August 4, 1945, Serial No. 609,033

3 Claims. (Cl. 260—78)

This invention relates to new resins and resinous compositions.

It has heretofore been proposed to react polyalkylene polamines with polybasic acids of a combined functionality of at least five to form crosslinked products which are either insoluble and infusible or capable of being rendered so when heated. It has also been proposed to heat together a diamine and a dicarboxylic acid to form linear polyamides which are generally characterized by solubility only in special solvents, such as cresol, fusibility at relatively high temperatures, formation of fibers, and other distinctive properties. Low molecular weight linear polyamides are carried, when heated, to higher polymers which yield fibers.

In contrast to the properties exhibited by the heretofore known resins formed from amines and carboxylic acids, the resins of this invention have surprisingly different and distinctive properties which render them useful in many types of applications involving coating, molding, laminating, and the like.

The resins of this invention are prepared by reacting by heating together at about 120° C. to about 270° C. an alkylene diamine, such as ethylene diamine, propylene diamine, hexamethylene diamine, decamethylene diamine, or mixtures thereof, and the non-volatile residue obtained in the manufacture of sebacic acid from castor oil.

In the manufacture of sebacic acid from castor oil, the oil is heated with a caustic alkali. This splits the oil, forming octanol-2, methyl hexyl ketone, the alkali salt of sebacic acid, and the alkali salts of various other long-chained acids. The alcohol and ketone are readily removed from the reaction mixture by distillation. The alkali salts which remain may then be dissolved in water and, upon slight acidification of the resulting solution, an oily layer separates. At a pH of about 6, the aqueous phase contains the alkali salt of sebacic acid, while the oily layer contains various other acids from the reaction. The term "by-product acids" is generally applied to the mixture of acids forming the oily layer.

These by-product acids may then be separated into two parts. After these acids have been washed with a dilute mineral acid, such as sulfuric or hydrochloric, they may be washed with water and dried. They may then be distilled under reduced pressure. Fatty acids which are primarily monobasic carboxylic acids may be taken off at 100° C. to 270° C. at pressures as low as 4 mm. This treatment leaves a residue which is a mixture of fatty acids, apparently primarily polybasic in character, although not necessarily exclusively so. Recent work indicates that some of these acids contain cycles, but the identity of the components of the mixture and elucidation of the complete structure of the components have not yet been possible. The non-volatile residue may be characterized as a clear, viscous, dark amber-colored oil or liquid having an acid number between 140 and 165 and an iodine number of 30 to 60, indicating some unsaturation. A 70% solution of the residue in toluene has a viscosity of about B to F on the Gardner-Holdt scale.

The non-volatile residue may be modified with relatively small amounts of added monobasic or polybasic aliphatic carboxylic acids, in general not over 10% of one or more such acids being added, based on the weight of the residue. Thus, it is not essential that all possible monocarboxylic acid be stripped from the residue. On the other hand, a small amount of such acids as oleic, stearic, lauric, succinic, glutaric, pimelic, azelaic, or sebacic may be combined with the residue. In general, the addition of the monobasic acids tends to give a softer resin, while the addition of dicarboxylic acids tends to raise the melting point and yield products of decreased solubility and compatibility with other resinous materials.

The choice of diamines and mixtures of diamines permits variations in the properties of the final products. Ethylene diamine and non-volatile residue, for example, give a resin melting at about 95° C., while propylene diamine substituted for the ethylene diamine yields a product melting at about 30° C. Mixtures of the two amines yield resins melting at intermediate temperatures. The behavior of the products from such diamines may be further influenced by addition of other diamines, for example, decamethylene diamine.

The exact ratio of diamine to acid is not critical, but it is desirable to use approximately chemically equivalent amounts of the two. A five or ten per cent excess of either is permissible, although the products made with a few per cent excess of diamine are generally preferable.

The reaction of non-volatile residue and diamine may be accomplished at temperatures between about 120° C. and about 270° C. Amine salts readily form and are converted to amides as heating continues. It is desirable to permit the escape of volatile products and even to assist their removal with a stream of inert gas, such as nitrogen, hydrogen, or carbon dioxide, which also helps to protect the product from oxidative changes. There may also be used reduced pressure or a combination of inert gas and reduced pressure. In a preferred mode of procedure, the initial reaction is accomplished at 140° to 200° C. and the temperature then carried up to 240°–250° C. Such procedure helps overcome difficulties due to foaming, for example.

It is a curious fact, however, that the final resin obtained is not dependent upon the exact temperature attained or time used. Resins are obtained which have about the same terminal properties, and continued heating over long periods of time does not give products having, by way of example, increasingly greater viscosities, as happens with the previously known truly linear polyamides. The new resins remain fusible and soluble even on prolonged heating, thereby distinguishing these new resins from previously known cross-linked polyamides. These properties recommend the new resins for hot-melt applications.

Methods of forming the new resins are shown in the following examples.

Example 1

Reaction equipment was set up with a one-liter, three-necked, round-bottomed flask equipped with stirrer, thermometer, carbon dioxide inlet extending to the bottom of the flask, dropping funnel, and reflux condenser mounted over a trap. A charge of 450 grams of residue from the preparation of sebacic acid from castor oil, which had been stripped of material volatilizing up to 280° C. at 5 mm. pressure, was placed in the reaction flask and heated to 165° C. Thereupon, there was added dropwise from the funnel 52 grams of a 69% ethylene diamine solution. The water content of the amine caused some foaming, but, by the time all of the diamine had been added, the water had been removed. The temperature was gradually raised to 210° C. Shortly thereafter, the pressure was progressively reduced, reaching 2 to 5 mm. in the course of two hours, while the temperature of the mixture attained 235° C. The product was cooled under an atmosphere of carbon dioxide to about 170° C., whereupon it was poured onto trays and permitted to solidify.

The resin obtained was a resinous solid which shattered under a blow from a hammer yet showed some plastic flow under pressure. It was soluble in isopropanol, butanol, cyclohexanol, chloroform, pyridine, capryl alcohol, mixtures of alcohols and toluene, etc. It melted at about 85° to 100° C. to give a fluid melt of low viscosity, being D on the Gardner-Holdt scale.

Example 2

The apparatus described above was utilized for the preparation of a resin from the residue from sebacic acid manufacture and propylene diamine. To a charge of 500 grams of the residue heated to about 140° C., there was slowly added 59 grams of propylene diamine of 86% purity (the chief impurity being water). After foaming had subsided, the temperature was raised to about 250° C. with a gradual reduction in pressure and the product heated for an hour under these conditions. It was then cooled in an atmosphere of carbon dioxide, poured into trays, and brought to room temperature.

The resin thus obtained was a soft solid, melting at about 30° C. A 40% solution in butanol had a Gardner-Holdt viscosity of D. The product was soluble in alcohols and mixtures of alcohols with other organic solvents, including toluene and various esters. Mixtures of this resin with the resin of Example 1 give compositions melting between 30° and 95° C.

Example 3

The reaction of residue acids and ethylene diamine was repeated under conditions generally similar to those shown above. After initial reaction at 105° C. to 185° C., the temperatures of the reaction mixtures were carried to 230° C. to 240° C. and maintained at such temperatures for periods of one-half hour to six hours in different preparations with reduction of pressure to 3 to 5 mm. The products obtained in all cases gave 40% solutions in butanol which had viscosities in the range of D to E on the Gardner-Holdt scale. The properties of all preparations were essentially the same except in respect of odor. The preparations heated two and one-half, three, four, and six hours, respectively, were practically odorless, whereas those heated less than two and one-half hours possessed some odor. It was further found that the reduction in pressure was a most important factor in ridding the product of odor. A preparation of resin with conditions otherwise the same but conducted at atmospheric pressure under an inert atmosphere still had considerable odor after three hours. The addition of a small amount of acetic anhydride to such product effectively rid it of odor.

Example 4

The procedure used in Example 1 was followed with 450 grams of a residual acid from sebacic acid manufacture, which had been incompletely stripped of volatile acid. According to tests, it contained about 7% of acids which distilled at 4 mm. pressure at 270° C. After the charge of residual acids had been heated to about 165° C., 54 grams of 69% ethylene diamine was slowly added. Then the reaction temperature was gradually raised to 235° C. and the pressure reduced as before. The product was partially cooled under an atmosphere of carbon dioxide and poured onto a tray to solidify. It melted below 90° C. and had otherwise much the same properties as described under Example 1, the melt having a Gardner-Holdt viscosity of B.

Example 5

By the same general procedure described above, a charge of 400 parts of non-volatile residue and 20 parts of sebacic acid was reacted with 58.5 parts of a 69.5% ethylene diamine solution. After the initial reaction at 160°–165° C., the temperature was carried to 230° C. and maintained there for three hours while the pressure was reduced to 4 mm. The product obtained melted over the range of 117° to 127° C. It was less readily taken up in solvents and had a lower solubility in various organic solvents than similar preparations free of sebacic acid. Nevertheless, this product has a remarkable stability in melted form.

Example 6

A reaction mixture of 547 parts of residue acids and 252 parts of pure decamethylene diamine was placed in a reaction vessel and heated and stirred under an atmosphere of nitrogen gas until the temperature of the mixture reached 215° C., at which temperature it was held for one hour while the pressure was reduced to about 5 mm. The solidified product had a melting point of 83°–88° C. It was somewhat tougher than the resin made from residue acid and ethylene diamine. It had similar solubilities but was somewhat less soluble in the lower alcohols and more soluble in the higher alcohols.

The resins of this invention are compatible with many other types of resinous materials. Because of the solubility of the new resins in many types of solvents, they may be incorporated in solvent solutions of many resins and oils and in lacquers and varnishes. They may also be fused with various types of resins and gums.

In one particularly important application, the new resins may be used with nitrocellulose to increase flexibility and improve adhesion to metals. The resins dissolve in the solvents of the nitrocellulose lacquers and, when deposited with the nitrocellulose lacquers and, when deposited with the nitrocellulose, give clear films. Such films have excellent solvent release and are not sensitive to such liquids as gasoline.

The resins of this invention may be taken up in drying oils and oil varnishes and serve to impart body thereto. The resulting compositions are dispersions rather than solutions and yield films which do not strike in. They are, therefore, useful for the coating of porous materials and for printing inks.

A valuable resinous composition may be prepared from a gum, such as manila gum, and one of the reaction products of the residue acids and an alkylene diamine. Manila gum is heated to about 650° F. and molten reaction product mixed therewith. Ratios of one part of gum to three parts of the reaction product of residue acids and ethylene diamine to three parts of gum to one part of said reaction product gave clear melts which dissolved in ethanol to give useful spirit varnishes. Films formed from these compositions retained the excellent solvent release of manila gum, were hard, but were also much tougher and less brittle than films from the gum alone.

The resins of this invention were also found compatible with ester gums, phenol-formaldehyde resins, including rosin-modified phenolics, maleic-rosin-polyhydric alcohol resins, and the like.

Many of the compositions with such resins are useful for the hot-melt coating of fibrous materials, giving flexible, heat-sealing coatings. As a matter of fact, the new resins alone are useful for such purpose. They give flexible films which are non-blocking and yet permit heat sealing. They may be used as a sealing wax. These resins may be fused with one to two per cent of paraffin wax to give films which have good resistance to moisture vapor.

Hot-melt coatings based on the resins of this invention may be used for the coating of metal foils, an application in which the adhesive qualities of these resins makes them particularly useful. On the other hand, these resins may be compounded with other resinous and film-forming materials along with waxes and the like to yield hot-melt coatings which have a sufficient degree of adhesion to metal parts to permit coating and protection against corrosion and yet permit stripping.

The adhesive qualities also indicate the use of these resins in pressure-sensitive adhesive compositions, particularly for the softer resins, such as formed from propylene diamine or butylene diamine.

Other charactersistics of importance are good pigment binding properties, toughness, and good release of solvents. These qualities are of importance in the preparation of heat-set, aniline, and intaglio type printing inks. These same properties are, of course, of importance in other applications, including the lacquers already mentioned, which are suitable for use on both wood and metal. Furthermore, in such applications, the resins of this invention improve resistance to cold-checking.

The general insolubility of the new resins in hydrocarbon oils at ordinary temperatures indicates their use as coatings where resistance to oils is required, as in coating of transformers and impregnation and filling of cables. The utility of the new resins in this respect can be increased by the addition of a small amount of a dicarboxylic acid to the residue acids.

Peculiarly, though not generally soluble in hydrocarbons, the resins of this invention form homogeneous compositions with petroleum oils of various types and degrees of molecular size. For example, gasoline, kerosene, and lubricating oils of a wide range of viscosities may be combined with the resins from residue acids and alkylene diamines by heating mixtures thereof. A mixture of 75 parts of the resin formed from the residue acids and ethylene diamine was heated at 300° F. with 25 parts of an S. A. E. 10 motor oil from a mid-continent crude. The resin dispersed in the oil to form a heat-stable, apparently homogeneous composition. When this mixture was cooled, a tough, plastic, tack-free, homogeneous, solid mass resulted. On prolonged storage in a warm room, this product showed no syneresis. A mixture of 25 parts of resin and 75 parts of oil, however, did show some exudation of oil. The stable masses just described possessed excellent impact resistance at low temperatures and freedom from flow at elevated temperatures. These compositions are suitable for use as components for fuels for jet propulsion engines.

The resinous compositions based on phenol-formaldehyde resins and the resins from the residue acids and alkylene diamines are also of considerable importance because they help to overcome the brittleness of the former resins and impart other valuable properties thereto. These compositions may be used in molding, coating, and laminating, as well as in other types of application of resins, since they are compatible with both cured and uncured phenolic resins. Interesting applications occur with molded gaskets, cork binders, friction linings, etc.

In connection with the compositions based on phenol-formaldehyde resins, it may be pointed out that true plasticizers for these resins have been hitherto lacking. Because of the alcohol solubility of both various phenol-formaldehyde condensates (including resorcinol resins and the like) and residue acids-alkylene diamine resins, the two types may be combined in solution and laid down together. The new resins do not affect the cure of the former resins, and they remain compatible when the combination is cured. This combination is of particular importance in imparting impact resistance to resin-bonded laminates. The combination is likewise of considerable importance in overcoming the brittleness of phenol-formaldehyde moldings.

The resins of this invention are characterized by many valuable and interesting properties. They melt fairly sharply to give melts of relatively low viscosity. The melted resins are stable on prolonged heating. They may be fused with a considerable variety of other resins and gums, imparting toughness, adhesion, and flexibility to the mixtures. The resins may also be dissolved in oils and varnishes. They may be dissolved with many common organic solvents and thus introduced into lacquers, such as nitro-cellulose lacquers, providing increased flexibility of films deposited therefrom and improved adhesion to metals. The films formed from compositions containing resins of this invention exhibit excellent release of solvent.

I claim:

1. A fusible, organic, solvent-soluble resinous composition, being the reaction product obtained by heating together at 120° to 270° C. in amounts which are chemically equivalent within ten per cent an alkylene primary diamine of not over ten carbon atoms and the amber-colored viscous residue containing long-chained polycarboxylic acids, having an acid number between 140 and 165, having an iodine number between thirty and sixty, and being the non-volatile material remaining from vacuum-distilling at 270° C. under four mm. pressure the by-product acids obtained in the preparation of sebacic acid from castor oil by treatment with alkali.

2. A fusible, organic, solvent-soluble resinous composition, being the reaction product obtained by heating together at 120° to 270° C. (1) the amber-colored viscous residue containing long-chained polycarboxylic acids, having an acid number between 140 and 165, having an iodine number between thirty and sixty, and being the non-volatile material remaining from vacuum-distilling at 270° C. under four mm. pressure the by-product acids obtained in the preparation of sebacic acid from castor oil by treatment with alkali and (2) ethylene diamine in an amount at least chemically equivalent to said residue and not in excess thereover of more than five per cent.

3. A fusible, organic, solvent-soluble resinous composition, being the reaction product obtained by heating together at 120° to 270° C. (1) the amber-colored viscous residue containing long-chained polycarboxylic acids, having an acid number between 140 and 165, having an iodine number between thirty and sixty, and being the non-volatile material remaining from vacuum-distilling at 270° C. under four mm. pressure the by-product acids obtained in the preparation of sebacic acid from castor oil by treatment with alkali and (2) propylene diamine in an amount at least chemically equivalent to said residue and not in excess thereover of more than five per cent.

CHARLES H. McKEEVER.

REFERENCES CITED

The following references are of record in the file of this patent:

UNITED STATES PATENTS

| Number | Name | Date |
|---|---|---|
| 2,130,948 | Carothers | Sept. 20, 1938 |
| 2,174,527 | Peterson | Oct. 3, 1939 |
| 2,372,090 | Kirkpatrick | Mar. 20, 1945 |
| 2,379,413 | Bradley | July 3, 1945 |